United States Patent
Sakaguchi et al.

[11] Patent Number: 5,836,350
[45] Date of Patent: Nov. 17, 1998

[54] ELECTROMAGNETIC VALVE

[75] Inventors: Yoshikazu Sakaguchi, Anjo; Takenori Kano, Toyota; Koichi Ichigo, Hekinan; Takeshi Nasu, Nishio; Takuji Akiyama, Anjo, all of Japan

[73] Assignee: Aisin Aw Co., Ltd., Japan

[21] Appl. No.: 691,648

[22] Filed: Aug. 2, 1996

[30] Foreign Application Priority Data

Aug. 4, 1995 [JP] Japan ................................ 7-199781

[51] Int. Cl.⁶ .................................................. F16K 35/00
[52] U.S. Cl. ............................................ 137/550; 137/544
[58] Field of Search ..................................... 137/550, 544

[56] References Cited

U.S. PATENT DOCUMENTS

| 1,059,104 | 4/1913 | Bailey | 137/550 |
| 1,799,103 | 3/1931 | Klimek | 137/550 |
| 2,545,944 | 3/1951 | Ellms | 137/550 |

FOREIGN PATENT DOCUMENTS

| 487907 | 11/1952 | Canada | 137/550 |
| 62-172874 | 11/1987 | Japan . | |
| 62-172875 | 11/1987 | Japan . | |
| 5-106756 | 4/1993 | Japan . | |

OTHER PUBLICATIONS

English Language Abstract–5–106756.

*Primary Examiner*—A. Michael Chambers
*Attorney, Agent, or Firm*—Lorusso & Loud

[57] ABSTRACT

An electromagnetic valve includes a hydraulic circuit coupling having an input port and a strainer mounted over the input port. The strainer is an entirely planar member and includes a filter portion having a plurality of pores forming a mesh and a retaining portion formed around the outer circumference of the filter portion. The strainer is fixed on the cylindrical wall of the input port of the hydraulic circuit coupling. The hydraulic circuit coupling may have a plurality of projections for engaging and holding the strainer. Alternatively, the retaining portion of the strainer may have a plurality of coplanar projections extending from its outer circumference coplanar with the filter portion and mating with a groove formed around the inner circumference of the input port of the coupling.

10 Claims, 5 Drawing Sheets

ELECTROMAGNETIC VALVE

BACKGROUND OF THE INVENTION

1. Field of the Invention

The present invention relates to an electromagnetic valve having a hydraulic circuit coupling and a strainer mounted in the input port of the hydraulic circuit coupling.

2. Related Art

Japanese Laid-Open Application ("Kokai") No. 106756/1993 discloses an electromagnetic valve, for use in a hydraulic control device for an automatic transmission, which has a strainer mounted in the input port of its hydraulic circuit coupling. This strainer has mounting pawls around its outer circumference with its central filter portion having a plurality of pores extending therethrough to form a mesh. The strainer is fitted over the distal end of the hydraulic circuit coupling by bending the mounting pawls.

FIG. 8 is a cross-sectional view of a portion of such a prior art electromagnetic valve having a hydraulic circuit coupling 1. The filter 4 has a plurality of pores 5 and is mounted over the distal end of the coupling 1. Overall, the strainer, inclusive of mounting pawls 7 extending from the circumference of the filter sheet, is three-dimensional. The mounting pawls 7 are bent and crimped to fit in a groove 2 formed around the circumferential surface of the coupling. Numeral 3 designates an 0-ring, and numeral 6 designates a pawl 7. However, formation of the joint between the hydraulic circuit coupling and the mounting pawls 7, involving fitting the pawls 7 in the groove 3, is a detriment to productivity and raises the production cost.

The discharge capacity of an electromagnetic valve is dictated by the diameter of the orifices formed in the electromagnetic valve. When the total effective area of the filter 4 is small, it may become smaller than the total of the cross-sectional areas of the orifice, if the filter 4 becomes clogged. As a result, the change-over of the valve in the hydraulic control device of an automatic transmission is delayed to cause shift shock. Thus, while a larger total effective area of the filter is desirable, the size of the pores 5 is limited by the size of foreign substances to be filtered off. Of course, one approach to enlarging the total effective area of the filter would be to increase the diameter D of the input port. However, the aforementioned electromagnetic valve of the prior art is constructed so that the filter or strainer 4 is mounted by bending the mounting pawls 7 around the distal end of the hydraulic circuit coupling, making use of the elastic deformation of the mounting pawls 7. This construction inevitably allows some axial movement of the strainer relative to the coupling (axial chattering) due to a gap between the filter 4 and the distal end of the hydraulic circuit coupling. In order to prevent invasion of the foreign substances through the gap into the solenoid valve, a bent portion 6 is formed at the outer circumferential edge of the filter 4. Because of the presence of the bent portion or skirt 6, therefore, the thickness C of the bent portion 6 of the filter 4 and spacing B for the manufacturing tolerance of the bent portion 6 are required and the input port diameter D is thereby limited.

SUMMARY OF THE INVENTION

It is, therefore, an object of the present invention to solve the above-described problems and to provide an electromagnetic valve which is equipped with a filter having a large total opening area so that it can be produced at a reasonable cost and with high productivity.

In order to achieve the aforementioned object, according to a first aspect of the present invention, there is provided an electromagnetic valve having a hydraulic circuit coupling with an input port. A strainer is mounted on the input port. The strainer is entirely planar. In other words, the strainer is thin and substantially two-dimensional with no bent portion, i.e. no portion not coplanar with the other portion(s). The strainer includes a filter portion having a plurality of pores formed therein and a retaining portion formed around the outer circumference of the strainer and fixed on the outer circumferential wall of the input port of the hydraulic circuit coupling. The hydraulic circuit coupling includes means for holding the strainer.

In one preferred embodiment of the present invention, the retainer portion includes a plurality of through holes formed around the outer circumference of the strainer which receive the holding means of the coupler.

In a second preferred embodiment of the present invention, the retainer portion has a plurality of notches formed around its outer circumference to receive the holding means of the coupling.

In the preferred embodiments the holding means of the coupling includes a plurality of projections positioned radially inside of the outermost circumference of the input port and projecting outward of the input port for engaging and securing the retainer.

A third preferred embodiment of the present invention provides an electromagnetic valve including a hydraulic circuit coupling having an input port and a strainer mounted on the input port. The strainer is planar and includes a filter portion in the form of a single planar sheet and having a plurality of pores extending therethrough to form a mesh. The strainer in this third preferred embodiment further includes a retainer portion having a plurality of coplanar projections extending from the outer circumference of the filter portion. In this embodiment the hydraulic circuit coupling has a groove formed around the inner circumference of its input port for receiving and holding the projections therein.

In any of the embodiments the hydraulic circuit coupling may be made of a resin.

DESCRIPTION OF THE PREFERRED EMBODIMENTS

Several embodiments of the present invention will now be described with reference to the accompanying drawings.

Figure 1:
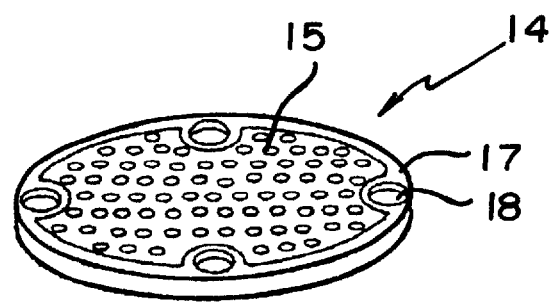
FIG. 1 is a perspective view of a strainer and a hydraulic circuit coupling according to a first embodiment of the present invention, disassembled.

In FIG. 1, reference numeral 11 designates a hydraulic circuit coupling 11 associated with an electromagnetic valve. A plurality of projections 13, e.g., four equidistantly spaced projections 13, are formed on the outer circumferential wall 12 of the coupling 11 for receiving and securing a strainer 14. The coupling 11 is preferably molded of a resin but can be metal.

Strainer 14 includes a single planar sheet filter portion and a retainer. The filter portion has a plurality of pores 15 which extend therethrough, and the retainer has through holes 18 formed around its outer circumference 17 for receiving the projections 13. Numeral 19 designates an O-ring.

The strainer 14 will have, for example, a thickness of 0.15 mm, an overall diameter of 9 mm and a pore diameter of 0.5 mm. The through holes 18 of the retainer have, for example, a diameter of 1.5 mm. Pores 15 may be made by etching.

Figure 8:
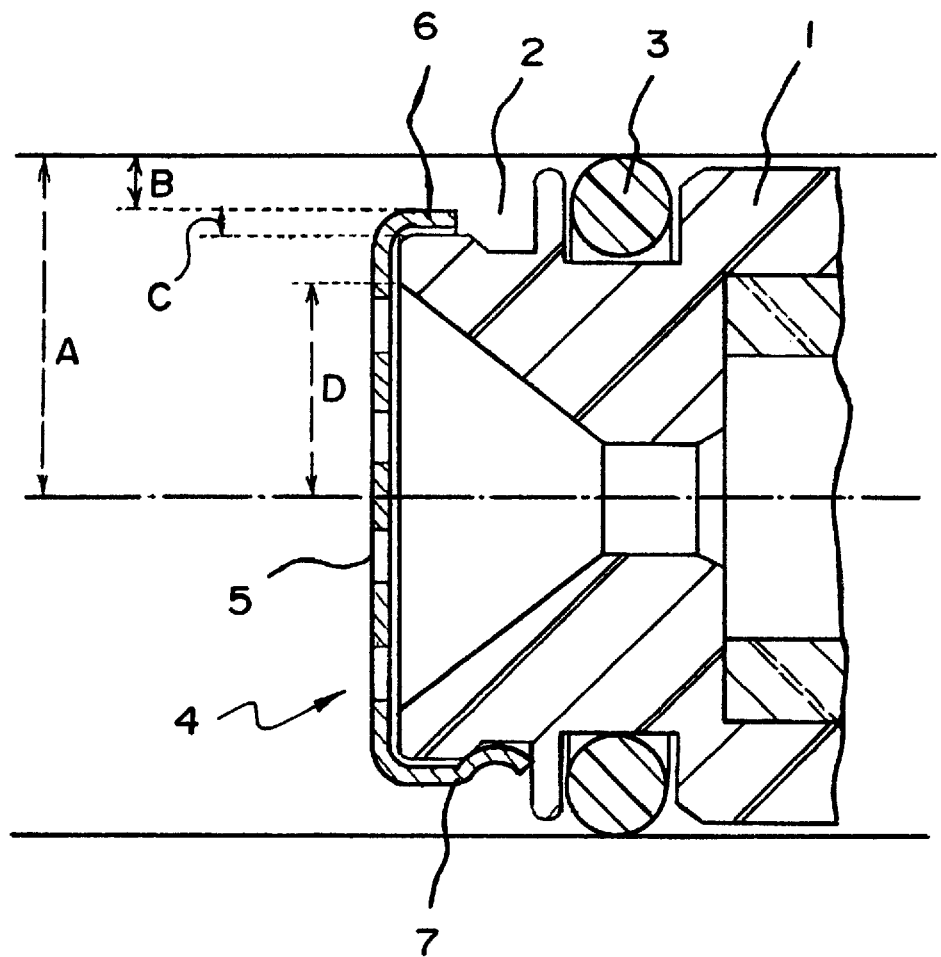
FIG. 8 is a cross-sectional view of a portion of a prior art electromagnetic valve showing a strainer fitted over its input port.

Thus, the strainer 14 is so thin that it is essentially a single planar sheet. As will become apparent from a reading of the ensuing description, various problems arise if the strainer is three-dimensional as in the prior art, e.g. FIG. 8.

Figure 2:
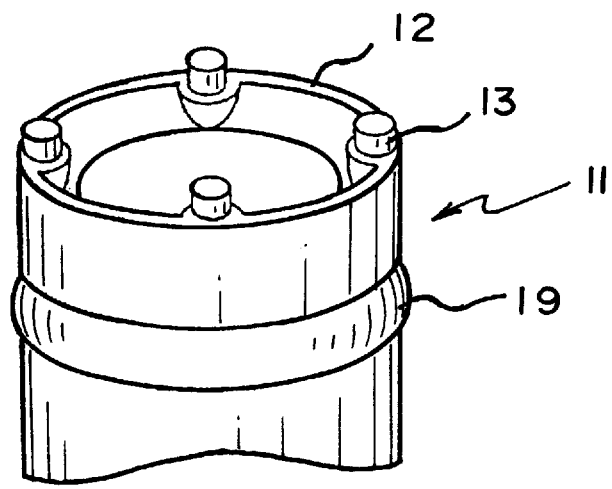
FIG. 2 is a perspective view of the assembled strainer and coupling of the embodiment shown in FIGS. 1 and 2.
Figure 2:
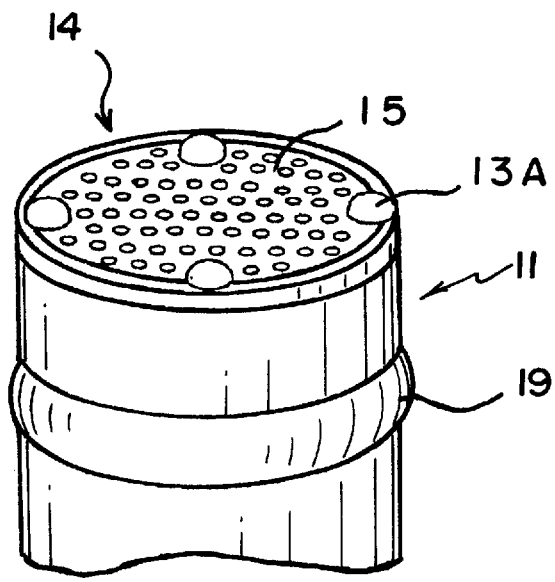

When the strainer 14 is to be fixed on the coupling 11, its through holes 18 are aligned with the projections 13 of the coupling 11. By welding or caulking the tips of the projections 13, the coupling 11 is united with the strainer 14, as shown in FIG. 2. Reference characters 13A designate the welded or caulked. tips of the projections 13.

Figure 3:
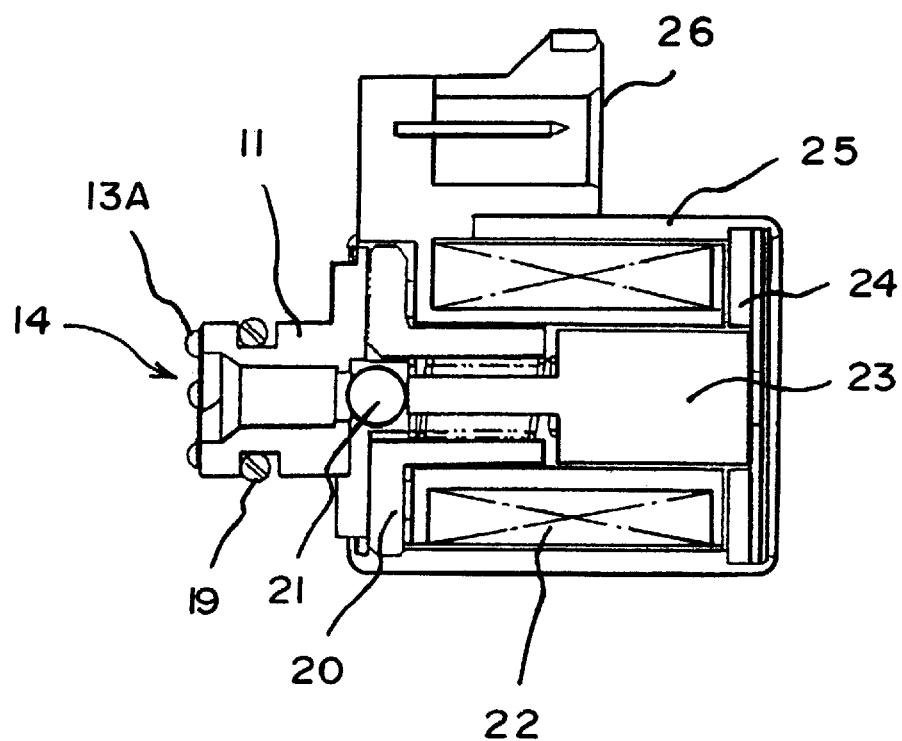
FIG. 3 is a cross-sectional view of the electromagnetic valve and strainer of the embodiment shown in FIGS. 1 and 2.

As a result, the strainer 14 can be fixed on the coupling 11 of the electromagnetic valve, specifically, on the input port of the hydraulic circuit coupling of the electromagnetic valve, as shown in FIG. 3.

Incidentally, in FIG. 3, the electromagnetic portion includes an inner base 20, a ball 21, a coil 22, a plunger 23, a core 24, a case 25 and a socket 26.

Figure 4:
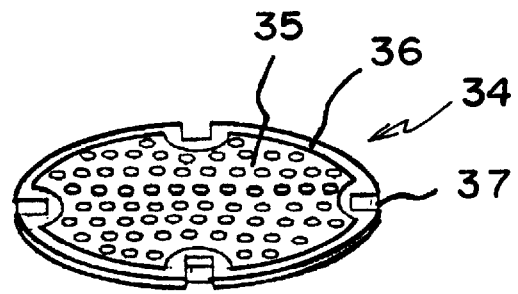
FIG. 4 is a perspective view of a strainer and hydraulic circuit coupling according to a second embodiment of the present invention.
Figure 4:
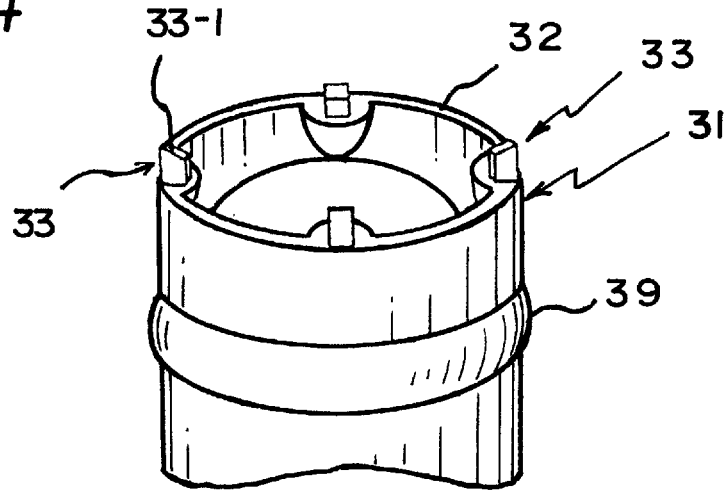
Figure 5:
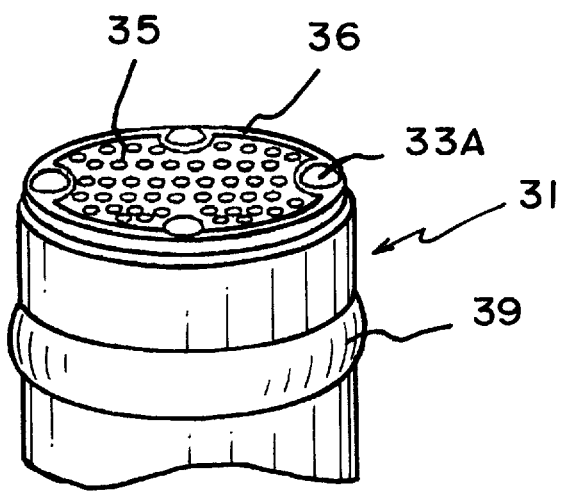
FIG. 5 is a perspective view showing the second embodiment in an assembled state.

FIGS. 4 and 5 show a second embodiment wherein reference numeral 31 designates the hydraulic circuit coupling of the electromagnetic valve. A plurality of projections 33, i.e., four equidistantly spaced projections 33, in FIGS. 4 and 5, are formed on the input port outer circumferential wall 32 for receiving and securing strainer 34. In this embodiment the coupling 31 is desirably molded of a metal but, alternatively, may be molded of a resin.

As in the previous embodiment, strainer 34 is constructed of a filter portion and a retainer portion. The filter portion is a meshed planar sheet having a plurality of pores 35, and the retainer portion has notches 37 formed in its outer circumference 36 which mate with the projections 33. Numeral 39 designates an O-ring.

When the strainer 34 is to be fixed on the coupling 31, its notches 37 are aligned with the projections 33 of the coupling 31. By folding over (bending) the tips of the projections 33, the coupling 31 is united with the strainer 34, as shown in FIG. 5. Reference characters 33A designate the welded or caulked tips of the projections 33. In this embodiment, as shown in FIG. 4, the projections 33 are tapered inward, as indicated at 33-1, to guide the strainer 34 in mounting. As a result, the strainer 34 can be easily and smoothly mounted on the coupling 31.

Figure 6:
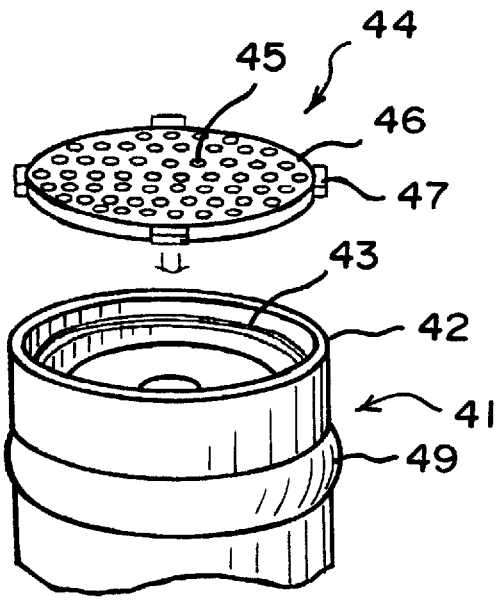
FIG. 6 is a perspective view of a strainer and a hydraulic circuit coupling according to a third embodiment of the present invention.
Figure 7:
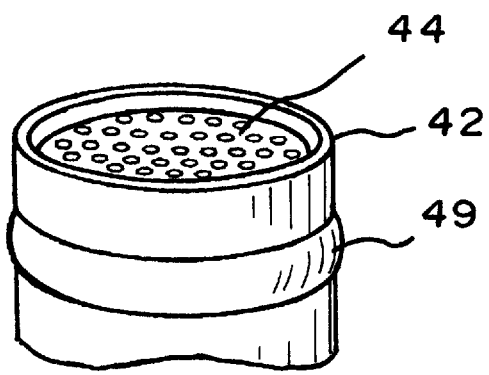
FIG. 7 is a perspective view showing the third embodiment in an assembled state.

FIG. 6 shows a third embodiment wherein reference numeral 41 designates a hydraulic circuit coupling of the electromagnetic valve. A groove 43 is formed around the inner surface of the input port cylindrical wall 42 of the coupling 41. In this embodiment, the coupling 41 is preferably a molded resin but may be molded of a metal.

Strainer 44 is in the form of a substantially planar sheet having a diameter sized to be substantially equal to the internal diameter of the input port. As in the previous embodiments, this strainer 44 includes a planar mesh filter portion having a plurality of pores 45. The retainer portion has coplanar projections 47 extending from its outer circumferential wall 46. Numeral 49 designates an O-ring.

When the strainer 44 is to be fixed on the coupling 41, it is positioned within the input port of the coupling 41. By press-fitting the strainer 44 in the hydraulic circuit coupling, the retainer portion (or projections) 47 are fitted in the groove 43.

Thus, in its broadest aspect the invention includes a strainer fabricated as a single planar sheet and including a filter portion having pores formed therethrough and a retainer portion surrounding the outer circumference of the filter portion. The strainer is secured, through the retainer portion, to the circumferential wall around the input port of the hydraulic circuit coupling. As a result, the step of forming mounting pawls as in the prior art is eliminated so that the number of steps can be reduced, with improvement in productivity, to provide an electromagnetic valve at a reasonable cost.

Moreover, because the strainer is planar overall and is mounted on the input port outer circumferential wall, unlike the prior art, errors in the manufacture of the mounting pawls are not a concern, and the hydraulic circuit coupling can be made as large as the diameter of the oil passage so that the diameter of the input port can be enlarged. As a result, the total effective area of the filter portion can be enlarged to reduce the influence of clogging upon the discharge capacity of the solenoid valve.

In the preferred embodiment wherein the retainer portion has holes which receive projections extending axially from the end face of the cylindrical wall, unlike the prior art, there is no gap between the strainer and the hydraulic circuit coupling. Accordingly, it is unnecessary to provide a bent portion (skirt) to prevent the invasion of foreign substances from entering into the solenoid valve through such a gap. In other words, because, unlike the prior art, no bent portion is present between the oil passage and the hydraulic circuit coupling, the hydraulic circuit coupling can have a diameter as large as that of the oil passage, i.e. it is possible to enlarge the diameter of the input port. By enlarging the total effective area of the filter portion, the influence of clogging on the discharge capacity of the solenoid valve is reduced.

In the second embodiment, because the retainer portion has an outer circumference which is notched to receive projections extending axially from the end face of the cylindrical wall forming the input port of the coupling, unlike the prior art, no gap is formed between the strainer and the hydraulic circuit coupling and it is therefore unnecessary to bend the strainer around the inlet port to prevent the invasion of foreign substances into the solenoid valve. In other words, unlike the prior art, no bent or crimped portion is present between the inner wall of the oil passage and the inlet of the hydraulic circuit coupling so that the inlet port of hydraulic circuit coupling can be made as large as the diameter of the oil passage.

When the axially extending projections are tapered toward the center of the input port, the tapered projections serve as guides, engaging the notches on the outer circumference of the strainer to facilitate assembly.

In the embodiments which have the projections extending axially from the distal end of the input port of the coupling, the total effective area of the filter portion can be enlarged to thereby reduce the influence of clogging upon the discharge capacity of the solenoid valve.

According to the third preferred embodiment, the strainer is also planar overall and includes: a filter portion with pores therethrough forming a mesh and a retaining portion having projections extending from its outer circumference, coplanar with the filter portion and, unlike the prior art, again no gap is formed between the strainer and the hydraulic circuit coupling. Accordingly, in this embodiment also it is unnecessary to form all axially extending bent portion (skirt) to prevent the invasion of foreign substances through the gap into the solenoid valve. Because there is no bent portion or skirt between the coupling and the interior surface of the oil passage receiving the coupling, the hydraulic circuit coupling can be made with a diameter as large as the diameter of the oil passage, thereby enlarging the diameter of the input port. As a result, the total effective area of the filter portion can be enlarged to reduce the influence of clogging upon the discharge capacity of the solenoid valve. Moreover, because the strainer is held in the groove by a press-fit, no subsequent fixing step such as welding, caulking or bending is required, thus improving productivity in its manufacture.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electromagnetic valve comprising:
   a hydraulic circuit coupling having an input port with a cylindrical interior surface and a circumferential groove in said cylindrical interior surface; and
   a planar strainer mounted within said input port and including:
      a filter portion in the form of a planar sheet having a plurality of pores extending therethrough; and
      a retainer with an outer circumference having a plurality of projections extending therefrom, said projections being coplanar with said filter portion and press-fit within said circumferential groove, whereby said strainer is held fixed within said input port.

2. An electromagnetic valve according to claim 1, wherein said hydraulic circuit coupling is made of a resin.

3. An electromagnetic valve comprising:
   a hydraulic circuit coupling having a cylindrical input port with interior and exterior cylindrical surfaces;
   a strainer in the form of a planar member with an outer circumference and including:
      a planar filter portion having a plurality of pores formed therethrough; and
      a retaining portion formed around said outer circumference of said strainer and fixed to said interior cylindrical surface of said input port of said hydraulic circuit coupling, spaced from said distal end; and
   holding means integrally formed on said hydraulic circuit coupling for holding said strainer, said retaining portion being fixed to said holding means.

4. An electromagnetic valve comprising:
   a hydraulic circuit coupling having an input port with a distal end;
   a strainer in the form of a planar member with an outer circumference and including:
      a planar filter portion having a plurality of pores formed therethrough; and
      a retaining portion formed around said outer circumference of said strainer and fixed to the input port of said hydraulic circuit coupling; and
   at least one projection extending from and integral with said hydraulic circuit coupling, said at least one projection being inserted into and fixed within said retaining portion of said strainer.

5. An electromagnetic valve according to claim 4, wherein said retaining portion has a plurality of through holes around its the outer circumference and wherein a plurality of projections, extending from and integral with said hydraulic circuit coupling, are inserted into and fixed within said through holes.

6. An electromagnetic valve according to claim 5 wherein said plural projections are deformable and wherein said strainer has been fixed to said hydraulic circuit coupling by insertion of the plural projections into the respective through holes and deformation of the deformable projections.

7. An electromagnetic valve according to claim 4, wherein said retaining portion includes a plurality of notches formed in the outer circumferential edge of said retaining portion and wherein a plurality of projections, extending from and integral with said hydraulic circuit coupling, are inserted into and fixed within said notches.

8. An electromagnetic valve according to claim 7 wherein said plural projections are deformable and wherein said strainer has been fixed to said hydraulic circuit coupling by insertion of the plural projections into the respective through holes and deformation of the deformable projections.

9. An electromagnetic valve according to claim 4, wherein said hydraulic circuit coupling has a plurality of projections positioned radially inside of the outermost circumference of said input port and projecting outward of said input port and wherein said retaining portion has a plurality of through holes in which said projections are inserted and fixed.

10. An electromagnetic valve according to claim 4, wherein said hydraulic circuit coupling is made of a resin.

* * * * *